(12) United States Patent
Yu et al.

(10) Patent No.: US 12,308,736 B2
(45) Date of Patent: May 20, 2025

(54) POWER FACTOR CORRECTION CIRCUIT

(71) Applicant: LITE-ON TECHNOLOGY CORPORATION, Taipei (TW)

(72) Inventors: Te-Hung Yu, Taipei (TW); Yu-Cheng Lin, Taipei (TW); Min-Hao Hsu, Taipei (TW); Chia-Hui Liang, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 232 days.

(21) Appl. No.: 18/208,953

(22) Filed: Jun. 13, 2023

(65) Prior Publication Data

US 2024/0313642 A1     Sep. 19, 2024

(30) Foreign Application Priority Data

Mar. 14, 2023   (CN) .......................... 202310264398.9

(51) Int. Cl.
*H02M 1/42* (2007.01)
*H02M 1/00* (2006.01)
*H02M 3/158* (2006.01)

(52) U.S. Cl.
CPC ....... *H02M 1/4225* (2013.01); *H02M 1/0064* (2021.05); *H02M 3/158* (2013.01)

(58) Field of Classification Search
CPC ... H02M 1/4225; H02M 1/0064; H02M 3/158
See application file for complete search history.

(56) References Cited

U.S. PATENT DOCUMENTS

| 2012/0086350 | A1 | 4/2012 | Lin et al. |
| 2016/0380531 | A1* | 12/2016 | Kataoka ............. H02M 1/4225 323/210 |
| 2019/0006960 | A1 | 1/2019 | Benabdelaziz et al. |
| 2022/0103062 | A1 | 3/2022 | Benabdelaziz et al. |
| 2022/0311276 | A1* | 9/2022 | Han ...................... H02M 7/103 |
| 2022/0345026 | A1 | 10/2022 | Sadilek et al. |

FOREIGN PATENT DOCUMENTS

| TW | 201119200 A | 6/2011 |
| TW | 201216785 A1 | 4/2012 |

* cited by examiner

*Primary Examiner* — Adolf D Berhane
*Assistant Examiner* — Afework S Demisse
(74) *Attorney, Agent, or Firm* — Li & Cai Intellectual Property (USA) Office

(57) ABSTRACT

A power factor correction circuit includes a first switch, a second switch, a third switch, a fourth switch, a fifth switch, a sixth switch, a seventh switch, a first inductance coil, a second inductance coil, a first capacitor, and a second capacitor. The first switch is connected to the second switch, the third switch, and the first inductance coil. The fifth switch is connected to the third switch and the second inductance coil. The sixth switch is connected to the first switch, the fourth switch, and the seventh switch. The seventh switch is further connected to the second switch, the first capacitor, and the second capacitor. The second inductance coil is further connected to the fourth switch and the first capacitor. The second capacitor is connected to the fourth switch, the sixth switch, and the first switch.

20 Claims, 11 Drawing Sheets

POWER FACTOR CORRECTION CIRCUIT

CROSS-REFERENCE TO RELATED PATENT APPLICATION

This application claims the benefit of priority to China Patent Application No. 202310264398.9, filed on Mar. 14, 2023 in People's Republic of China, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power factor correction circuit.

BACKGROUND OF THE DISCLOSURE

Power converters are widely used in power supplies of computers and telecommunication equipment. The power converter includes an alternating current (AC)/direct current (DC) converter. Efficiency, power density, and holdup time are the three main requirements for the AC/DC converter on the market. The AC/DC converter that is commonly available on the market includes a bridge circuit including diodes, an inductor, a capacitor, and a transistor. However, since the inductor and the capacitor used in the AC/DC converter typically have large volumes, the power density of the power converter is poor.

SUMMARY OF THE DISCLOSURE

In response to the above-referenced technical inadequacies, the present disclosure provides a power factor correction circuit.

In order to solve the above-mentioned problems, one of the technical aspects adopted by the present disclosure is to provide a power factor correction circuit. The power factor correction circuit includes a first switch, a second switch, a third switch, a fourth switch, a fifth switch, a sixth switch, a seventh switch, a first inductance coil, a second inductance coil, a first capacitor, and a second capacitor. The first switch includes a first terminal and a second terminal. The second switch includes a third terminal and a fourth terminal. The third terminal is connected to the second terminal. The third switch includes a fifth terminal and a sixth terminal. The fifth terminal is connected to the second terminal. The fourth switch includes a seventh terminal and an eighth terminal. The seventh terminal is connected to the first terminal. The fifth switch includes a ninth terminal and a tenth terminal. The ninth terminal is connected to the sixth terminal. The sixth switch includes an eleventh terminal and a twelfth terminal. The eleventh terminal is connected to the first terminal. The seventh switch includes a thirteenth terminal and a fourteenth terminal. The thirteenth terminal is connected to the twelfth terminal, and the fourteenth terminal is connected to the fourth terminal. The first inductance coil includes a fifteenth terminal and a sixteenth terminal. The sixteenth terminal is connected to the second terminal. The second inductance coil includes a seventeenth terminal and an eighteenth terminal. The seventeenth terminal is connected to the tenth terminal, and the eighteenth terminal is connected to the eighth terminal. The first capacitor includes a nineteenth terminal and a twentieth terminal. The nineteenth terminal is connected to the eighth terminal, and the twentieth terminal is connected to the fourth terminal. The second capacitor includes a twenty-first terminal and a twenty-second terminal. The twenty-first terminal is connected to the first terminal, and the twenty-second terminal is connected to the fourth terminal.

In one of the possible or preferred embodiments, the first inductance coil is coupled to the second inductance coil.

In one of the possible or preferred embodiments, the third switch is a transistor.

In one of the possible or preferred embodiments, the fifth switch is a diode.

In one of the possible or preferred embodiments, the fifth switch is a transistor.

In one of the possible or preferred embodiments, the fourth switch is a transistor.

In one of the possible or preferred embodiments, the first switch is a transistor, and the second switch is a transistor.

In one of the possible or preferred embodiments, the sixth switch is a diode, and the seventh switch is a diode.

In one of the possible or preferred embodiments, the sixth switch is a transistor, and the seventh switch is a transistor.

In one of the possible or preferred embodiments, the power factor correction circuit further includes a third inductance coil. The third inductance coil includes a twenty-third terminal and a twenty-fourth terminal, and the twenty-fourth terminal is connected to the twelfth terminal.

In one of the possible or preferred embodiments, the third inductance coil is coupled to the first inductance coil.

In one of the possible or preferred embodiments, the third inductance coil is coupled to the second inductance coil.

In one of the possible or preferred embodiments, the power factor correction circuit further includes a third inductance coil, an eighth switch, and a ninth switch. The third inductance coil includes a twenty-third terminal and a twenty-fourth terminal, the eighth switch includes a twenty-fifth terminal and a twenty-sixth terminal, the ninth switch includes a twenty-seventh terminal and a twenty-eighth terminal, the twenty-third terminal is connected to the fifteenth terminal, the twenty-fifth terminal is connected to the first terminal, the twenty-sixth terminal is connected to the twenty-fourth terminal, the twenty-seventh terminal is connected to the twenty-fourth terminal, and the twenty-eighth terminal is connected to the fourth terminal.

In one of the possible or preferred embodiments, the power factor correction circuit further includes a fourth inductance coil, a tenth switch, and an eleventh switch. The fourth inductance coil includes a twenty-ninth terminal and a thirtieth terminal, the tenth switch includes a thirty-first terminal and a thirty-second terminal, the eleventh switch includes a thirty-third terminal and a thirty-fourth terminal, the twenty-ninth terminal is connected to the fifteenth terminal, the thirty-first terminal is connected to the first terminal, the thirty-second terminal is connected to the thirtieth terminal, the thirty-third terminal is connected to the thirtieth terminal, and the thirty-fourth terminal is connected to the fourth terminal In one of the possible or preferred embodiments, the first inductance coil is coupled to the third inductance coil, and the fourth inductance coil is coupled to the third inductance coil.

In one of the possible or preferred embodiments, the second inductance coil is coupled to the first inductance coil, the third inductance coil, and the fourth inductance coil.

Therefore, in the power factor correction circuit provided by the present disclosure, a holdup time of an output voltage of the power factor correction circuit is increased, and a volume of the first capacitor is reduced. Due to the reduced volume of the first capacitor, a power density of the power factor correction circuit is improved, and material costs for manufacturing of the power factor correction circuit are reduced. In addition, the power factor correction circuit can have more space available for adding new elements, so as to improve its efficiency.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
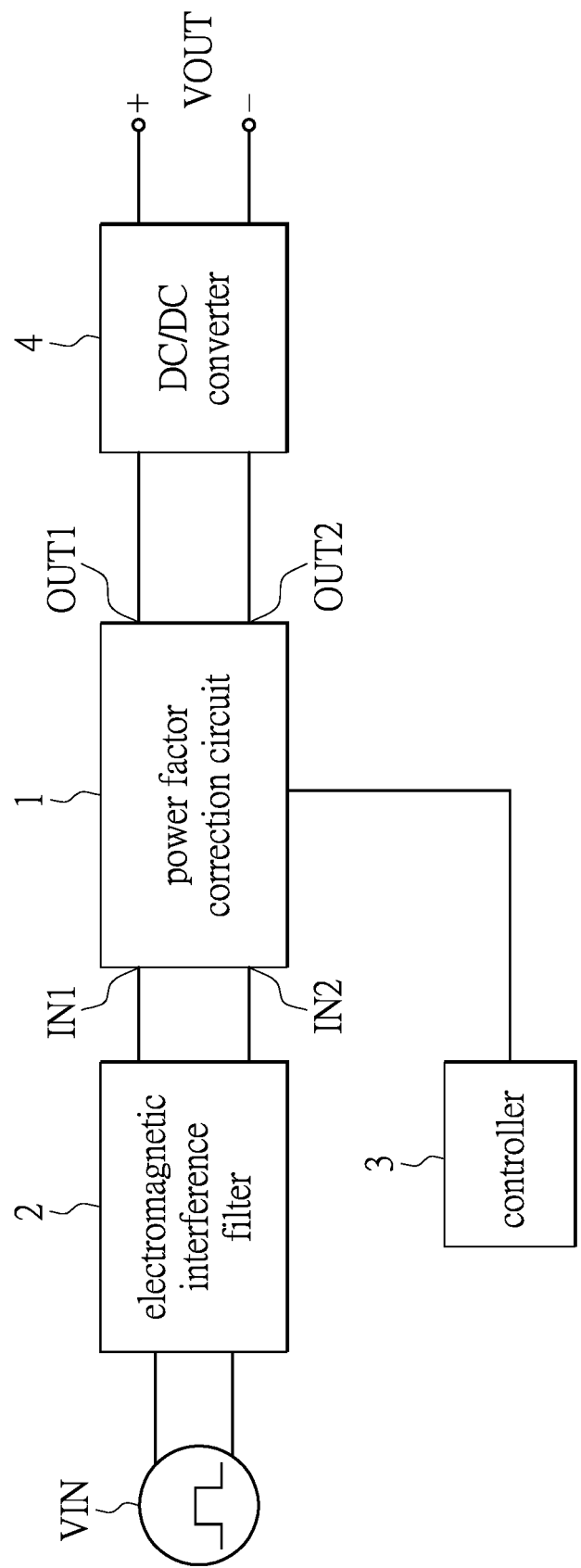
FIG. 1 is a functional block diagram of a power conversion system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like. In addition, the term "connect" in the context of the present disclosure means that there is a physical connection between two elements, and the two elements are directly or indirectly connected.

FIG. 1 is a functional block diagram of a power conversion system according to one embodiment of the present disclosure. Referring to FIG. 1, the power conversion system includes, for example, a power factor correction circuit 1, an electromagnetic interference (EMI) filter 2, a controller 3, and a DC (direct current)/DC converter 4, but the present disclosure is not limited thereto. The power factor correction circuit 1 includes a first input terminal IN1 and a second input terminal IN2. The first input terminal IN1 and the second input terminal IN2 may be connected to the electromagnetic interference filter 2. The electromagnetic interference filter 2 may be connected to an input power source VIN, and the input power source VIN is an alternating current (AC) voltage source. The electromagnetic interference filter 2 is used to filter noises of an AC voltage signal outputted by the input power source VIN. The controller 3 may be connected to the power factor correction circuit 1. The controller 3 is used to control states of multiple switches of the power factor correction circuit 1. The power factor correction circuit 1 includes a first output terminal OUT1 and a second output terminal OUT2. The DC/DC converter 4 may be connected to the first output terminal OUT1 and the second output terminal OUT2. The DC/DC converter 4 generates an output voltage VOUT. The output voltage VOUT may be a DC voltage signal.

Figure 2A:
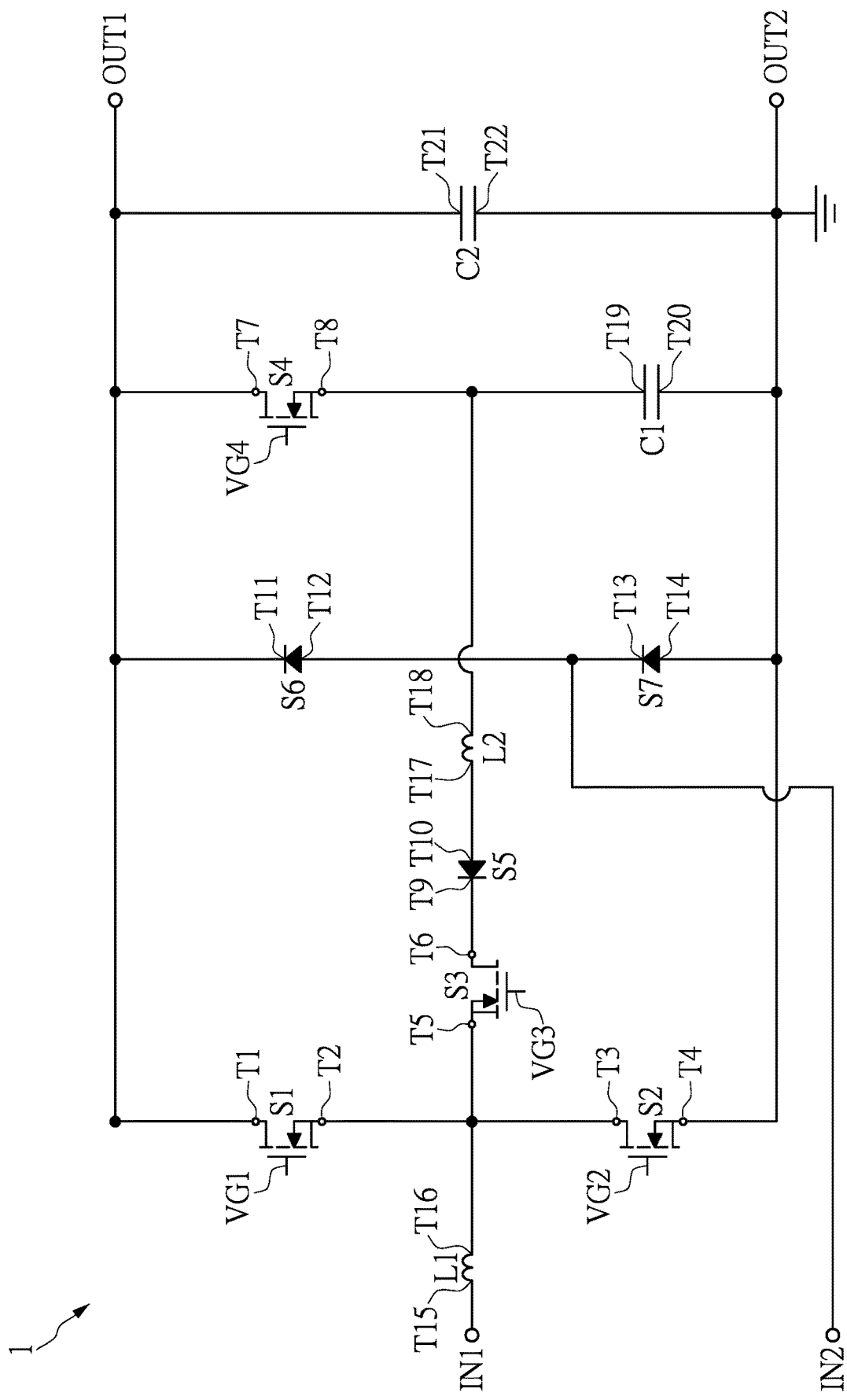
FIG. 2A is a schematic circuit diagram of a power factor correction circuit according to a first embodiment of the present disclosure.

FIG. 2A is a schematic circuit diagram of a power factor correction circuit according to a first embodiment of the present disclosure. Referring to FIG. 1 and FIG. 2A, the power factor correction circuit 1 includes, for example, a first switch S1, a second switch S2, a third switch S3, a fourth switch S4, a fifth switch S5, a sixth switch S6, a seventh switch S7, a first inductance coil L1, a second inductance coil L2, a first capacitor C1, and a second capacitor C2, but the present disclosure is not limited thereto. The first switch S1 may be a transistor. For example, the first switch S1 may be an n-type metal-oxide-semiconductor field effect transistor (NMOSFET). The first switch S1 includes a first terminal T1, a second terminal T2, and a first control terminal VG1. The first terminal T1, the second terminal T2, and the first control terminal VG1 may be a drain, a source, and a gate, respectively. The second switch S2 may be a transistor. For example, the second switch S2 may be an n-type metal-oxide-semiconductor field effect transistor (NMOSFET). The second switch S2 includes a third terminal T3, a fourth terminal T4, and a second control terminal VG2. The third terminal T3, the fourth terminal T4, and the second control terminal VG2 may be a drain, a source, and a gate, respectively. The third terminal T3 of the second switch S2 is connected to the second terminal T2 of the first switch S1. The first control terminal VG1 and the second control terminal VG2 may be connected to the controller 3.

The third switch S3 may be a transistor. For example, the third switch S3 may be an n-type metal-oxide-semiconductor field effect transistor (NMOSFET). The third switch S3 includes a fifth terminal T5, a sixth terminal T6, and a third control terminal VG3. The fifth terminal T5, the sixth terminal T6, and the third control terminal VG3 may be a source, a drain, and a gate, respectively. The fifth terminal T5 of the third switch S3 is connected to the second terminal T2 of the first switch S1 and the third terminal T3 of the second switch S2. The third control terminal VG3 may be connected to the controller 3. The fourth switch S4 may be a transistor. For example, the fourth switch S4 may be an n-type metal-oxide-semiconductor field effect transistor (NMOSFET). The fourth switch S4 includes a seventh terminal T7, an eighth terminal T8, and a fourth control terminal VG4. The seventh terminal T7, the eighth terminal T8, and the fourth control terminal VG4 may be a drain, a source, and a gate, respectively. The seventh terminal T7 of the fourth switch S4 is connected to the first terminal T1 of the first switch S1, and the fourth control terminal VG4 may be connected to the controller 3.

The fifth switch S5 may be a diode. The fifth switch S5 includes a ninth terminal T9 and a tenth terminal T10. The ninth terminal T9 and the tenth terminal T10 may be a cathode and an anode, respectively. The ninth terminal T9 of the fifth switch S5 is connected to the sixth terminal T6 of the third switch S3.

The sixth switch S6 may be a diode. The sixth switch S6 includes an eleventh terminal T11 and a twelfth terminal T12. The eleventh terminal T11 and the twelfth terminal T12 may be a cathode and an anode, respectively. The eleventh terminal T11 of the sixth switch S6 is connected to the first terminal T1 of the first switch S1 and the seventh terminal T7 of the fourth switch S4. The seventh switch S7 may be a diode. The seventh switch S7 includes a thirteenth terminal T13 and a fourteenth terminal T14. The thirteenth terminal T13 and the fourteenth terminal T14 may be a cathode and an anode, respectively. The thirteenth terminal T13 of the seventh switch S7 is connected to the twelfth terminal T12 of the sixth switch S6 and the second input terminal IN2. The fourteenth terminal T14 of the seventh switch S7 is connected to the fourth terminal T4 of the second switch S2.

The first inductance coil L1 includes a fifteenth terminal T15 and a sixteenth terminal T16. The fifteenth terminal T15 may be connected to the first input terminal IN1. The sixteenth terminal T16 is connected to the second terminal T2 of the first switch S1, the third terminal T3 of the second switch S2, and the fifth terminal T5 of the third switch S3. The second inductance coil L2 includes a seventeenth terminal T17 and an eighteenth terminal T18. The seventeenth terminal T17 is connected to the tenth terminal T10 of the fifth switch S5. The eighteenth terminal T18 is connected to the eighth terminal T8 of the fourth switch S4. An inductance value of the first inductance coil L1 may be greater than an inductance value of the second inductance coil L2.

The first capacitor C1 includes a nineteenth terminal T19 and a twentieth terminal T20. The nineteenth terminal T19 and the twentieth terminal T20 may be a positive electrode and a negative electrode, respectively. The nineteenth terminal T19 is connected to the eighth terminal T8 of the fourth switch S4 and the eighteenth terminal T18 of the second inductance coil L2. The twentieth terminal T20 is connected to the fourth terminal T4 of the second switch S2 and the fourteenth terminal T14 of the seventh switch S7. The second capacitor C2 includes a twenty-first terminal T21 and a twenty-second terminal T22. The twenty-first terminal T21 and the twenty-second terminal T22 may be a positive electrode and a negative electrode, respectively. The twenty-first terminal T21 is connected to the first terminal T1 of the first switch S1, the eleventh terminal T11 of the sixth switch S6, and the seventh terminal T7 of the fourth switch S4. The twenty-second terminal T22 is connected to the fourth terminal T4 of the second switch S2, the fourteenth terminal T14 of the seventh switch S7, and the twentieth terminal T20 of the first capacitor C1. The twenty-second terminal T22 may be grounded.

Specifically, when the input power source VIN (as shown in FIG. 1) is normal, the third switch S3 and the fifth switch S5 are in an off state. When a voltage of the input power source VIN is abnormal or the input power source VIN stops providing power, the controller 3 drives the third switch S3 and the fifth switch S5 to switch from the off state to an on state. When the third switch S3 and the fifth switch S5 are in the on state, electric charges discharged from the first capacitor C1 flow into the second capacitor C2 sequentially through the second inductance coil L2, the fifth switch S5, the third switch S3, and the first switch S1. At this time, the first switch S1, the third switch S3, the fifth switch S5, and the second inductance coil L2 act as a boost converter to increase a voltage of the second capacitor C2. Therefore, even if the input power source VIN stops providing power, the voltage of the second capacitor C2 is not immediately decreased but can be maintained for a period of time. Since the boost converter that includes the first switch S1, the third switch S3, the fifth switch S5, and the second inductance coil L2 increases the voltage of the second capacitor C2, a capacitance of the first capacitor C1 does not need to be large. Accordingly, a volume of the first capacitor C1 can be decreased.

Figure 2B:
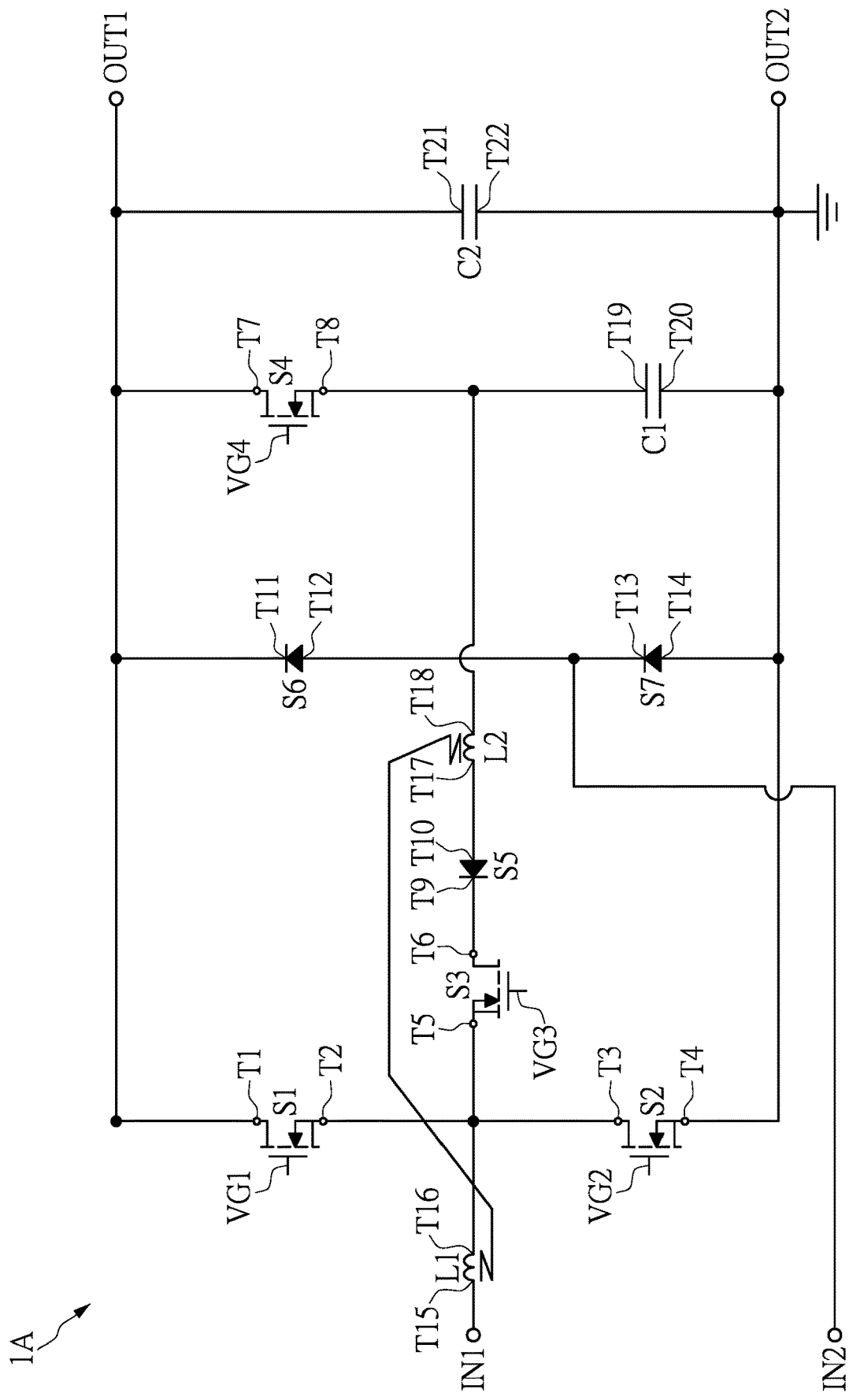
FIG. 2B is a schematic circuit diagram of the power factor correction circuit according to a second embodiment of the present disclosure.

FIG. 2B is a schematic circuit diagram of the power factor correction circuit according to a second embodiment of the present disclosure. Differences between a power factor correction circuit 1A of FIG. 2B and the power factor correction circuit 1 of FIG. 2A are illustrated as follows. Referring to FIG. 2B, the first inductive coil L1 and the second inductive coil L2 may be coupled to each other. For example, the first inductive coil L1 and the second inductive coil L2 may be two different inductance coils of the same magnetic element. Since the first inductance coil L1 and the second inductance coil L2 share one magnetic core of the magnetic element, the first inductance coil L1 and the second inductance coil L2 may be coupled to each other, and an area of the power factor correction circuit can be decreased.

Figure 3A:
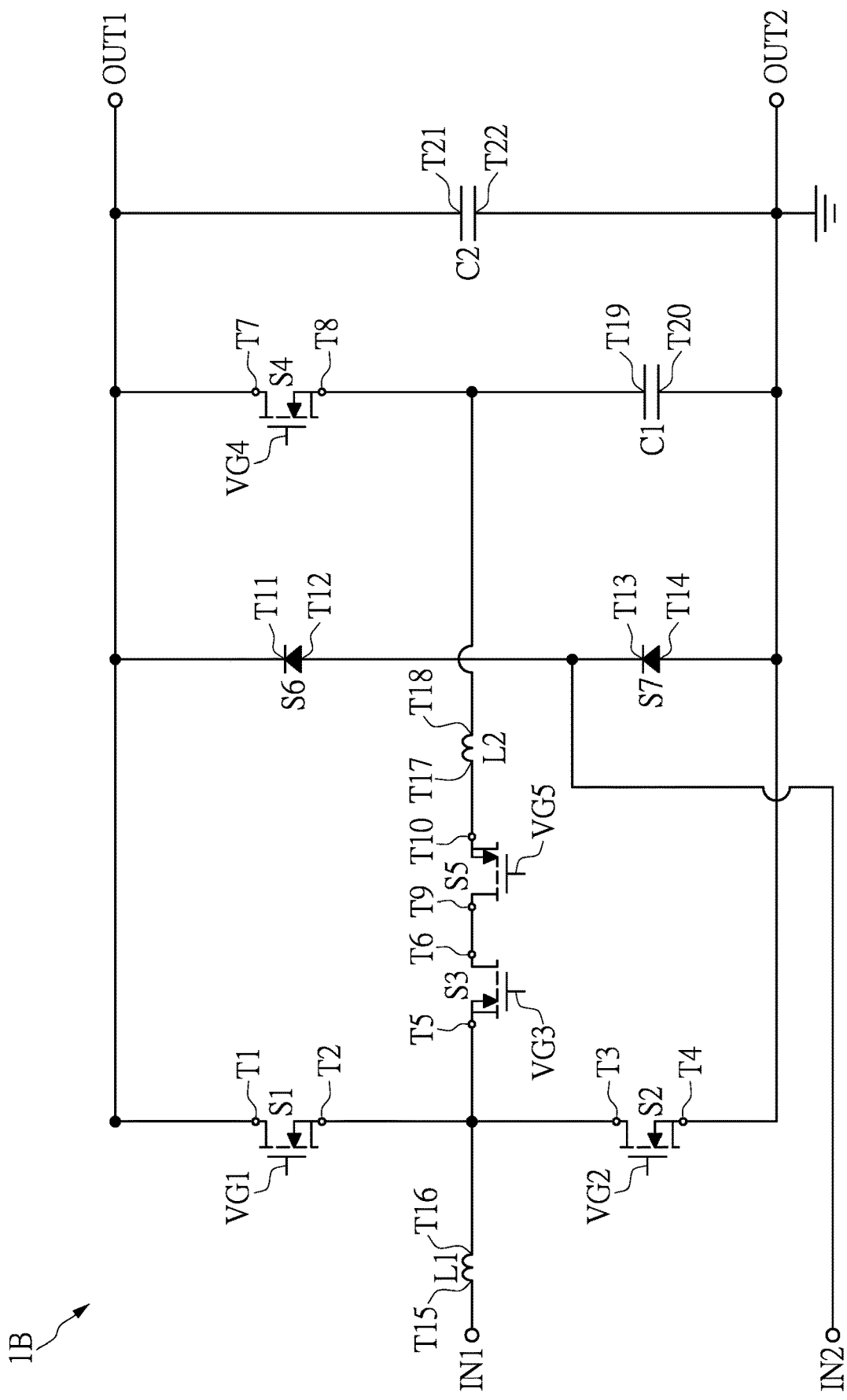
FIG. 3A is a schematic circuit diagram of the power factor correction circuit according to a third embodiment of the present disclosure.

FIG. 3A is a schematic circuit diagram of the power factor correction circuit according to a third embodiment of the present disclosure. Differences between a power factor correction circuit 1B of FIG. 3A and the power factor correction circuit 1 of FIG. 2A are illustrated as follows. The fifth switch S5 of FIG. 3A may be a transistor. The fifth switch S5 may be an n-type metal-oxide-semiconductor field effect transistor (NMOSFET). The fifth switch S5 includes the ninth terminal T9, the tenth terminal T10, and a fifth control terminal VG5. The ninth terminal T9, the tenth terminal T10, and the fifth control terminal VG5 may be a drain, a source, and a gate, respectively. The fifth control terminal VG5 may be connected to the controller 3 (as shown in FIG. 1).

Figure 3B:
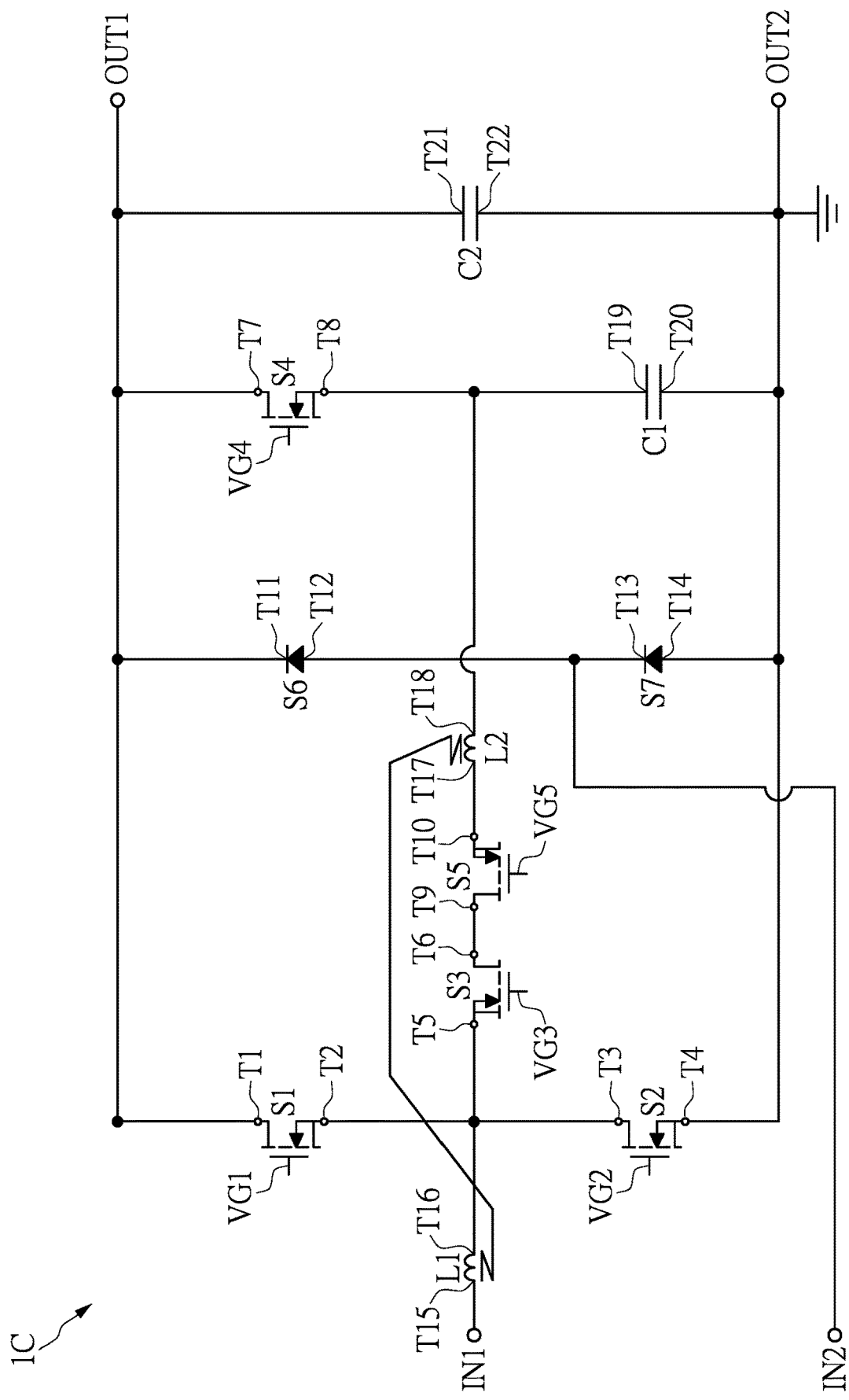
FIG. 3B is a schematic circuit diagram of the power factor correction circuit according to a fourth embodiment of the present disclosure.

FIG. 3B is a schematic circuit diagram of the power factor correction circuit according to a fourth embodiment of the present disclosure. Differences between a power factor correction circuit 1C of FIG. 3B and the power factor correction circuit 1B of FIG. 3A are illustrated as follows. The first inductance coil L1 and the second inductance coil L2 of FIG. 3B may be coupled to each other.

Figure 4A:
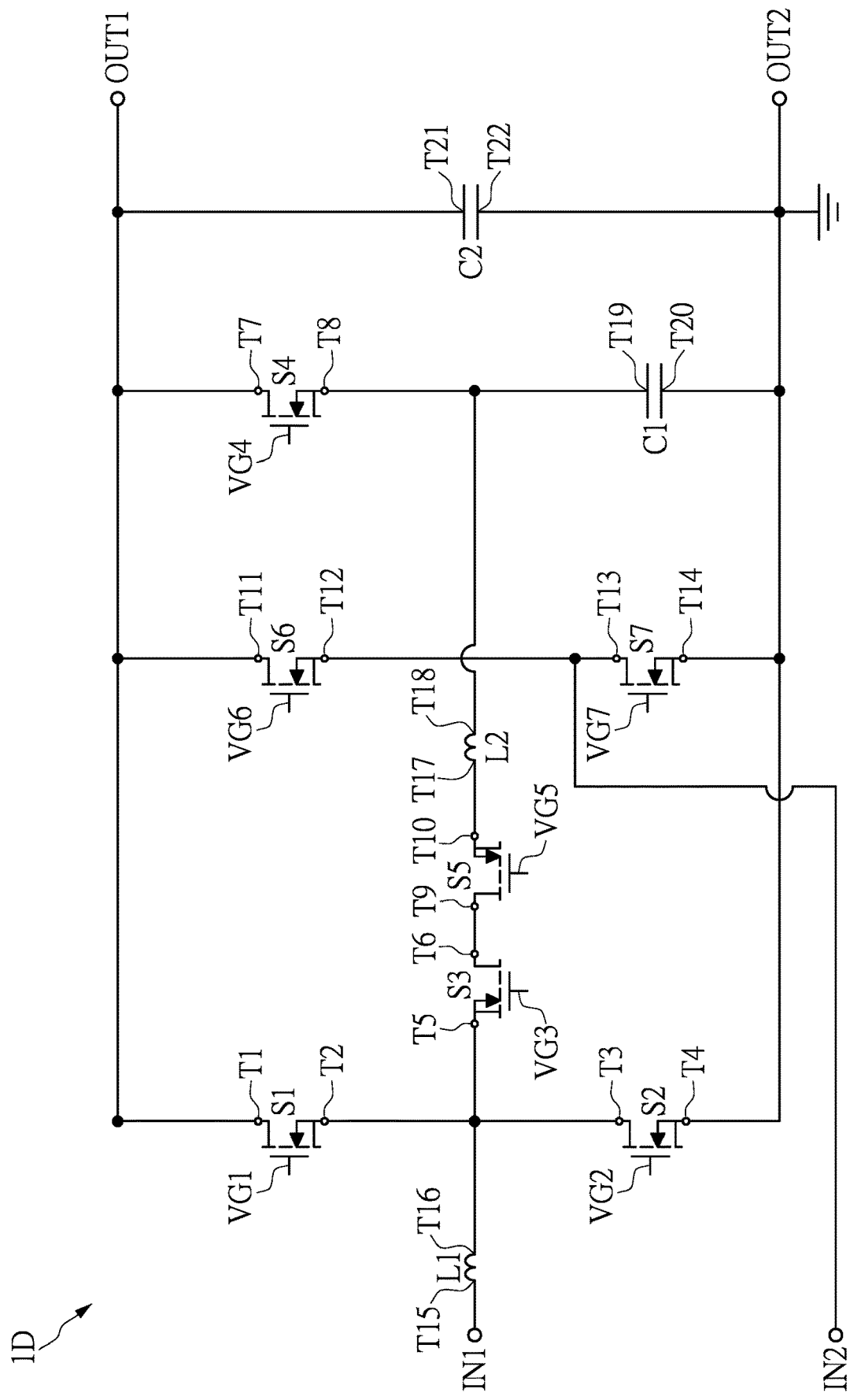
FIG. 4A is a schematic circuit diagram of the power factor correction circuit according to a fifth embodiment of the present disclosure.

FIG. 4A is a schematic circuit diagram of the power factor correction circuit according to a fifth embodiment of the present disclosure. Differences between a power factor correction circuit 1D of FIG. 4A and the power factor correction circuit 1B of FIG. 3A are illustrated as follows. The sixth switch S6 of FIG. 4A may be a transistor. The seventh switch S7 of FIG. 4A may be a transistor. The sixth switch S6 and the seventh switch S7 may be two n-type metal-oxide-semiconductor field effect transistors (NMOSFET). The sixth switch S6 includes the eleventh terminal T11, the twelfth terminal T12, and a sixth control terminal VG6. The eleventh terminal T11, the twelfth terminal T12, and the sixth control terminal VG6 may be a drain, a source, and a gate, respectively. The sixth control terminal VG6 may be connected to the controller 3 (referring to FIG. 1). The seventh switch S7 includes the thirteenth terminal T13, the fourteenth terminal T14, and a seventh control terminal VG7. The thirteenth terminal T13, the fourteenth terminal T14, and the seventh control terminal VG7 may be a drain, a source, and a gate, respectively. The seventh control terminal VG7 may be connected to the controller 3 (referring to FIG. 1). Furthermore, the material of each of the first switch S1, the second switch S2, the sixth switch S6, and the seventh switch S7 may be gallium nitride (GAN), so as to increase their switching frequencies. Moreover, in other embodiments, the fifth switch S5 may be a diode.

Figure 4B:
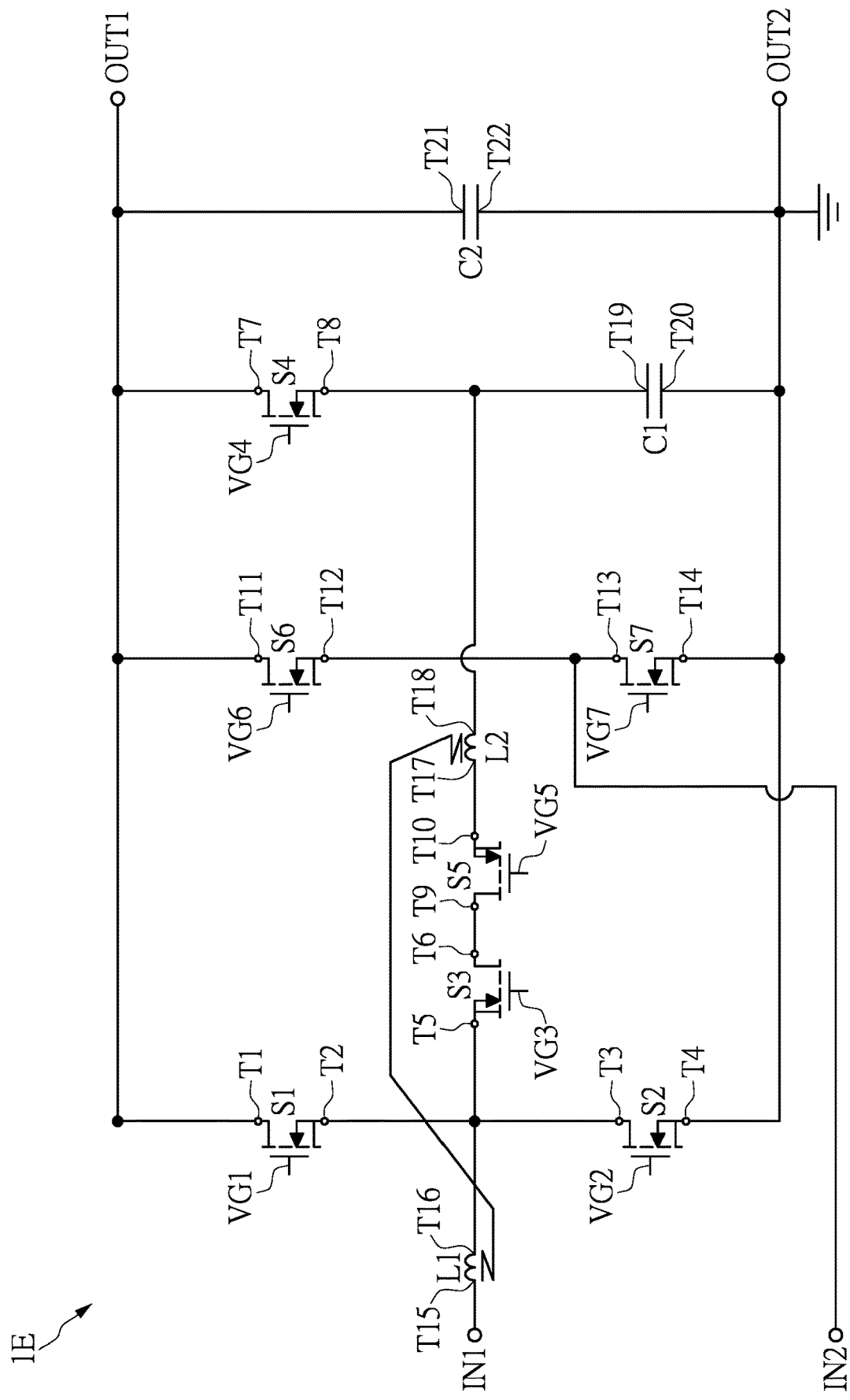
FIG. 4B is a schematic circuit diagram of the power factor correction circuit according to a sixth embodiment of the present disclosure.

FIG. 4B is a schematic circuit diagram of the power factor correction circuit according to a sixth embodiment of the present disclosure. Differences between a power factor correction circuit 1E of FIG. 4B and the power factor correction circuit 1C of FIG. 3B are illustrated as follows. The sixth switch S6 of FIG. 4B may be a transistor. The seventh switch S7 of FIG. 4B may be a transistor. The sixth switch S6 and the seventh switch S7 may be two n-type metal-oxide-semiconductor field effect transistors (NMOSFET). The sixth switch S6 includes the eleventh terminal T11, the twelfth terminal T12, and the sixth control terminal VG6. The eleventh terminal T11, the twelfth terminal T12, and the sixth control terminal VG6 may be a drain, a source, and a gate, respectively. The sixth control terminal VG6 may be connected to the controller 3 (referring to FIG. 1). The seventh switch S7 includes the thirteenth terminal T13, the fourteenth terminal T14, and the seventh control terminal VG7. The thirteenth terminal T13, the fourteenth terminal T14, and the seventh control terminal VG7 may be a drain, a source, and a gate, respectively. The seventh control terminal VG7 may be connected to the controller 3 (as shown in FIG. 1). Furthermore, the material of each of the first switch S1, the second switch S2, the sixth switch S6, and the seventh switch S7 may be gallium nitride (GAN) for increasing their switching frequencies. Moreover, in other embodiments, the fifth switch S5 may be a diode.

Figure 5:
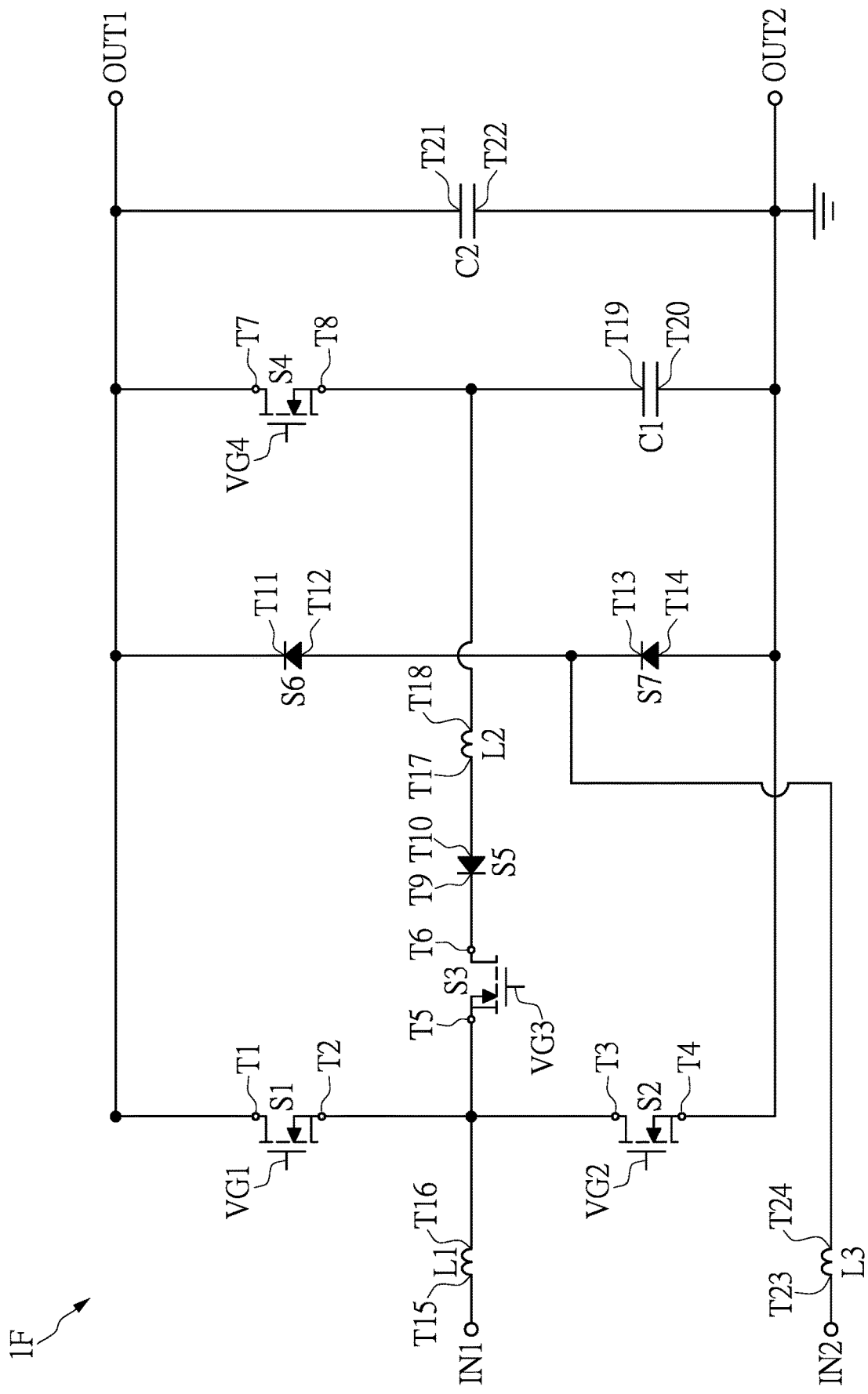
FIG. 5 is a schematic circuit diagram of the power factor correction circuit according to a seventh embodiment of the present disclosure.

FIG. 5 is a schematic circuit diagram of the power factor correction circuit according to a seventh embodiment of the present disclosure. Different from the power factor correction circuit 1 of FIG. 2A, a power factor correction circuit 1F of FIG. 5 further includes a third inductance coil L3. The third inductance coil L3 can reduce ripples appearing in the first capacitor C1 and the second capacitor C2. The third inductance coil L3 includes a twenty-third terminal T23 and a twenty-fourth terminal T24. The twenty-third terminal T23 may be connected to the second input terminal IN2. The twenty-fourth terminal T24 is connected to the twelfth terminal T12 of the sixth switch S6 and the thirteenth terminal T13 of the seventh switch S7.

In other embodiments of the present disclosure, the fifth switch S5 of FIG. 5 may be a transistor. For example, the fifth switch S5 of FIG. 5 may be an n-type metal-oxide-semiconductor field effect transistor (NMOSFET). In other embodiments, the sixth switch S6 of FIG. 5 may be a transistor, and the seventh switch S7 of FIG. 5 may be a transistor. The sixth switch S6 and the seventh switch S7 may be two n-type metal-oxide-semiconductor field effect transistors (NMOSFET). In other embodiments, the third inductance coil L3 may be coupled to the first inductance coil L1. For example, the third inductance coil L3 and the first inductance coil L1 may be two different inductance coils of the same magnetic element. Since the third inductance coil L3 and the first inductance coil L1 share one magnetic core of the magnetic element, the third inductive coil L3 and the first inductive coil L1 may be coupled to each other. Similarly, in other embodiments, the third inductance coil L3 may be coupled to the second inductance coil L2.

Figure 6:
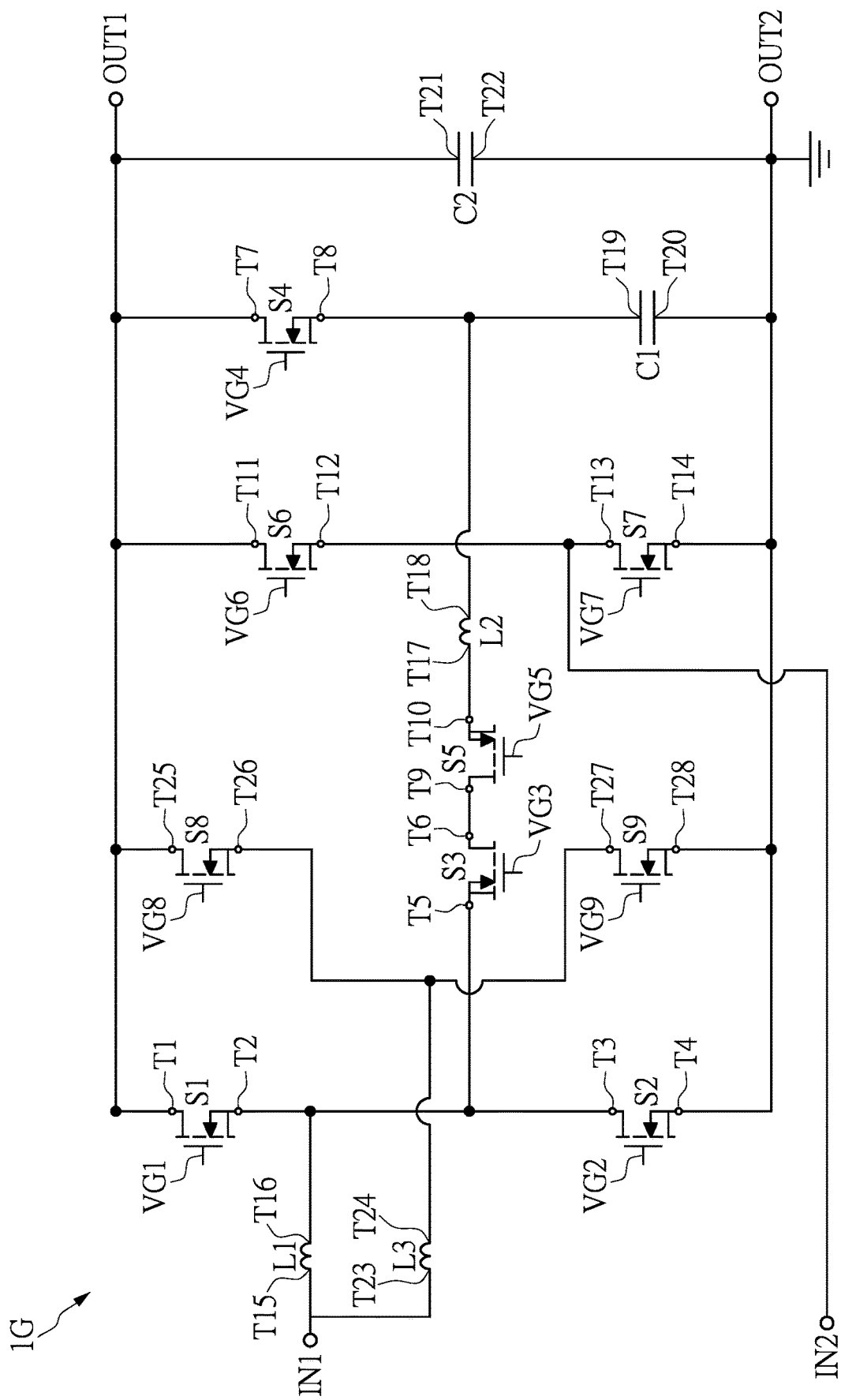
FIG. 6 is a schematic circuit diagram of the power factor correction circuit according to an eighth embodiment of the present disclosure.

FIG. 6 is a schematic circuit diagram of the power factor correction circuit according to an eighth embodiment of the present disclosure. Differences between a power factor correction circuit 1G of FIG. 6 and the power factor correction circuit 1 of FIG. 2A are illustrated as follows. The fifth switch S5 of FIG. 6 may be a transistor. The fifth switch S5 may be an n-type metal-oxide-semiconductor field effect transistor (NMOSFET). The fifth switch S5 includes the ninth terminal T9, the tenth terminal T10, and the fifth control terminal VG5. The ninth terminal T9, the tenth terminal T10, and the fifth control terminal VG5 may be a drain, a source, and a gate, respectively. The fifth control terminal VG5 may be connected to the controller 3 (as shown in FIG. 1). In other embodiments, the fifth switch S5 of FIG. 6 may be a diode.

The sixth switch S6 of FIG. 6 may be a transistor. The sixth switch S6 may be an n-type metal-oxide-semiconductor field effect transistor (NMOSFET). The sixth switch S6 includes the eleventh terminal T11, the twelfth terminal T12, and the sixth control terminal VG6. The eleventh terminal T11, the twelfth terminal T12, and the sixth control terminal VG6 may be a drain, a source, and a gate, respectively. The sixth control terminal VG6 may be connected to the controller 3 (as shown in FIG. 1). In other embodiments, the sixth switch S6 of FIG. 6 may be a diode.

The seventh switch S7 of FIG. 6 may be a transistor. The seventh switch S7 may be an n-type metal-oxide-semiconductor field effect transistor (NMOSFET). The seventh switch S7 includes the thirteenth terminal T13, the fourteenth terminal T14, and the seventh control terminal VG7. The thirteenth terminal T13, the fourteenth terminal T14, and the seventh control terminal VG7 may be a drain, a source, and a gate, respectively. The seventh control terminal VG7 may be connected to the controller 3 (as shown in FIG. 1). In other embodiments, the seventh switch S7 of FIG. 6 may be a diode.

The power factor correction circuit 1G of FIG. 6 further includes a third inductance coil L3, an eighth switch S8, and a ninth switch S9. The third inductance coil L3, the eighth switch S8, and the ninth switch S9 can reduce the ripples in the first capacitor C1 and the second capacitor C2. The third inductance coil L3 includes the twenty-third terminal T23 and the twenty-fourth terminal T24. The twenty-third terminal T23 of the third inductance coil L3 is connected to the fifteenth terminal T15 of the first inductance coil L1 and the first input terminal IN1. In other embodiments, the third inductance coil L3 may be coupled to the first inductance coil L1. For example, the third inductance coil L3 and the first inductance coil L1 may be two different inductance coils of the same magnetic element. Since the third inductance coil L3 and the first inductance coil L1 share one magnetic core of the magnetic element, the third inductance coil L3 and the first inductance coil L1 may be coupled to each other. Similarly, in other embodiments, the third inductance coil L3 may be coupled to the second inductance coil L2.

The eighth switch S8 may be a transistor. The eighth switch S8 may be an n-type metal-oxide-semiconductor field effect transistor (NMOSFET). The eighth switch S8 includes a twenty-fifth terminal T25, a twenty-sixth terminal T26, and an eighth control terminal VG8. The twenty-fifth terminal T25, the twenty-sixth terminal T26, and the eighth control terminal VG8 may be a drain, a source, and a gate, respectively. The twenty-fifth terminal T25 is connected to the first terminal T1 of the first switch S1, the eleventh terminal T11 of the sixth switch S6, the seventh terminal T7 of the fourth switch S4, and the twenty-first terminal T21 of the second capacitor C2. The twenty-sixth terminal T26 is connected to the twenty-fourth terminal T24 of the third inductance coil L3, and the eighth control terminal VG8 may be connected to the controller 3 (as shown in FIG. 1).

The ninth switch S9 may be a transistor. The ninth switch S9 may be an n-type metal-oxide-semiconductor field effect transistor (NMOSFET). The ninth switch S9 includes a twenty-seventh terminal T27, a twenty-eighth terminal T28, and a ninth control terminal VG9. The twenty-seventh terminal T27, the twenty-eighth terminal T28, and the ninth control terminal VG9 may be a drain, a source, and a gate, respectively. The twenty-seventh terminal T27 is connected to the twenty-fourth terminal T24 of the third inductance coil L3 and the twenty-sixth terminal T26 of the eighth switch S8. The twenty-eighth terminal T28 is connected to the fourth terminal T4 of the second switch S2, the fourteenth terminal T14 of the seventh switch S7, the twentieth terminal T20 of the first capacitor C1, and the twenty-second terminal T22 of the second capacitor C2. The ninth control terminal VG9 may be connected to the controller 3 (as shown in FIG. 1).

Furthermore, the material of each of the first switch S1, the second switch S2, the sixth switch S6, the seventh switch S7, the eighth switch S8, and the ninth switch S9 may be gallium nitride (GAN) for increasing their switching frequencies.

Figure 7:
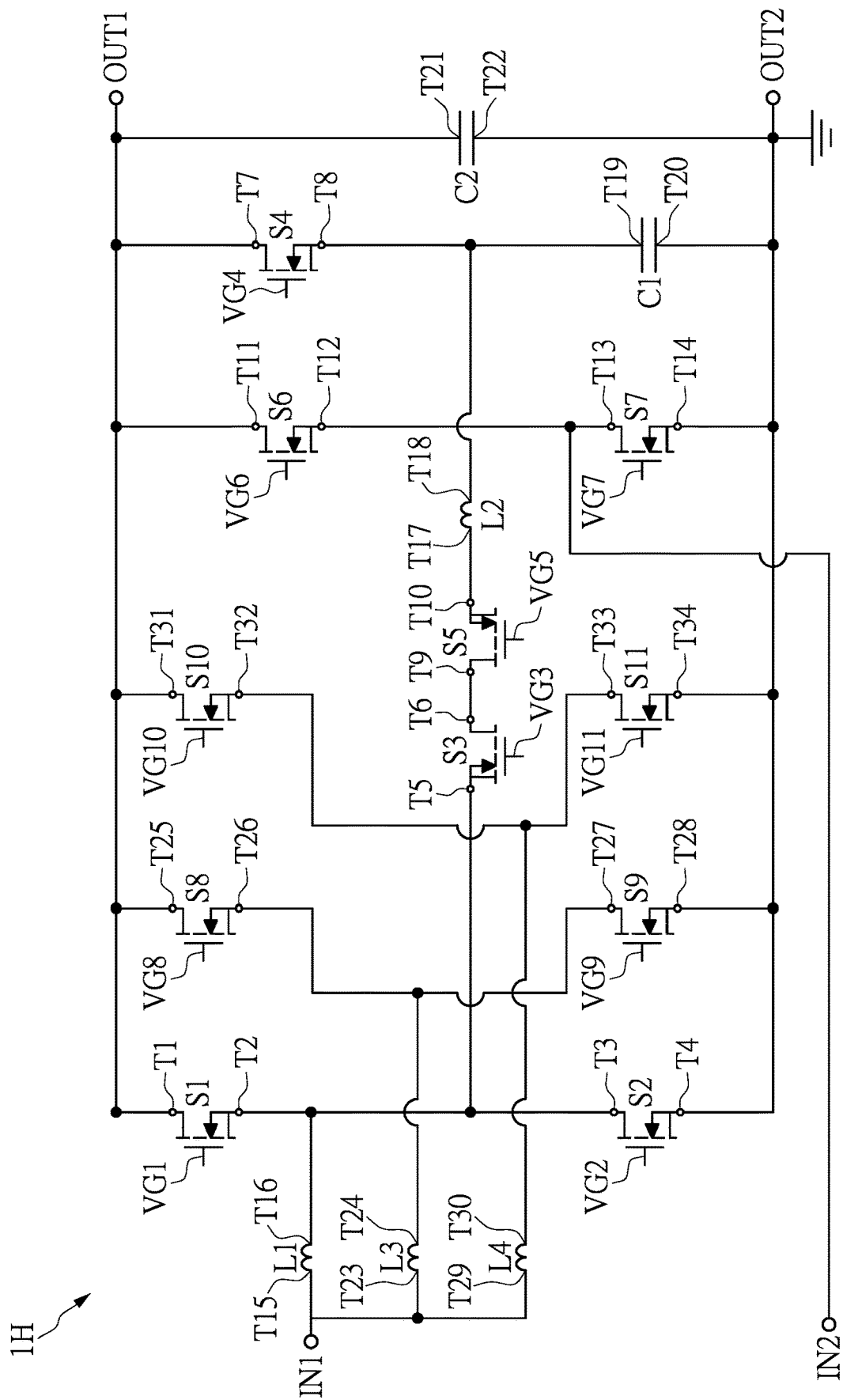
FIG. 7 is a schematic circuit diagram of the power factor correction circuit according to a ninth embodiment of the present disclosure.

FIG. 7 is a schematic circuit diagram of the power factor correction circuit according to a ninth embodiment of the present disclosure. Different from the power factor correction circuit 1G of FIG. 6, a power factor correction circuit 1H of FIG. 7 further includes a fourth inductance coil L4, a tenth switch S10, and an eleventh switch S11. The fourth inductance coil L4, the tenth switch S10, and the eleventh switch S11 can reduce the ripples appearing in the first capacitor C1 and the second capacitor C2. The fourth inductance coil L4 includes a twenty-ninth terminal T29 and a thirtieth terminal T30. The twenty-ninth terminal T29 is connected to the fifteenth terminal T15 of the first inductance coil L1, the twenty-third terminal T23 of the third inductance coil L3, and the first input terminal IN1.

The tenth switch S10 may be a transistor. The tenth switch S10 may be an n-type metal-oxide-semiconductor field effect transistor (NMOSFET). The tenth switch S10 includes a thirty-first terminal T31, a thirty-second terminal T32, and a tenth control terminal VG10. The thirty-first terminal T31, the thirty-second terminal T32, and the tenth control terminal VG10 may be a drain, a source, and a gate, respectively. The thirty-first terminal T31 is connected to the first terminal T1 of the first switch S1, the twenty-fifth terminal T25 of the eighth switch S8, the eleventh terminal T11 of the sixth switch S6, the seventh terminal T7 of the fourth switch S4, and the twenty-first terminal T21 of the second capacitor C2. The thirty-second terminal T32 is connected to the thirtieth terminal T30 of the fourth inductance coil L4. The tenth control terminal VG10 may be connected to the controller 3 (as shown in FIG. 1).

The eleventh switch S11 may be a transistor. The eleventh switch S11 may be an n-type metal-oxide-semiconductor field effect transistor (NMOSFET). The eleventh switch S11 includes a thirty-third terminal T33, a thirty-fourth terminal T34, and an eleventh control terminal VG11. The thirty-third terminal T33, the thirty-fourth terminal T34, and the eleventh control terminal VG11 may be a drain, a source, and a gate, respectively. The thirty-third terminal T33 is connected to the thirtieth terminal T30 of the fourth inductance coil L4 and the thirty-second terminal T32 of the tenth switch S10. The thirty-fourth terminal T34 is connected to the fourth terminal T4 of the second switch S2, the twenty-eighth terminal T28 of the ninth switch S9, the fourteenth terminal T14 of the seventh switch S7, the twentieth terminal T20 of the first capacitor C1, and the twenty-second terminal T22 of the second capacitor C2. The eleventh control terminal VG11 may be connected to the controller 3 (as shown in FIG. 1).

Moreover, the material of each of the first switch S1, the second switch S2, the sixth switch S6, the seventh switch S7, the eighth switch S8, the ninth switch S9, the tenth switch S10, and the eleventh switch S11 may be gallium nitride (GaN) for increasing their switching frequencies.

In other embodiments, the fifth switch S5 of FIG. 7 may be a diode, the sixth switch S6 of FIG. 7 may be a diode, the seventh switch S7 of FIG. 7 may be a diode, the first inductance coil L1 of FIG. 7 may be coupled to the third inductance coil L3, and the fourth inductance coil L4 of FIG. 7 may be coupled to the third inductance coil L3. For example, the first inductance coil L1, the third inductance coil L3, and the fourth inductance coil L4 may be three different inductance coils of the same magnetic element. Since the first inductance coil L1, the third inductance coil L3, and the fourth inductance coil L4 share one magnetic core of the magnetic element, the first inductance coil L1 and the third inductance coil L3 may be coupled to each other, and the fourth inductance coil L4 and the third inductance coil L3 may be coupled to each other. The first inductance coil L1, the second inductance coil L2, and the third inductance coil L3 can reduce the ripples appearing in the first capacitor C1 and the second capacitor C2.

In other embodiments, the second inductance coil L2 may be coupled to the first inductance coil L1, the third inductance coil L3, and the fourth inductance coil L4. For example, the first inductance coil L1, the second inductance coil L2, the third inductance coil L3, and the fourth inductance coil L4 may be four different inductive coils of the same magnetic element. Since the first inductance coil L1, the second inductance coil L2, the third inductance coil L3, and the fourth inductance coil L4 share one magnetic core of the magnetic element, the first inductance coil L1, the second inductance coil L2, the third inductance coil L3, and the fourth inductance coil L4 may be coupled to each other. At the same time, the area of the power factor correction circuit may be reduced.

Figure 8:
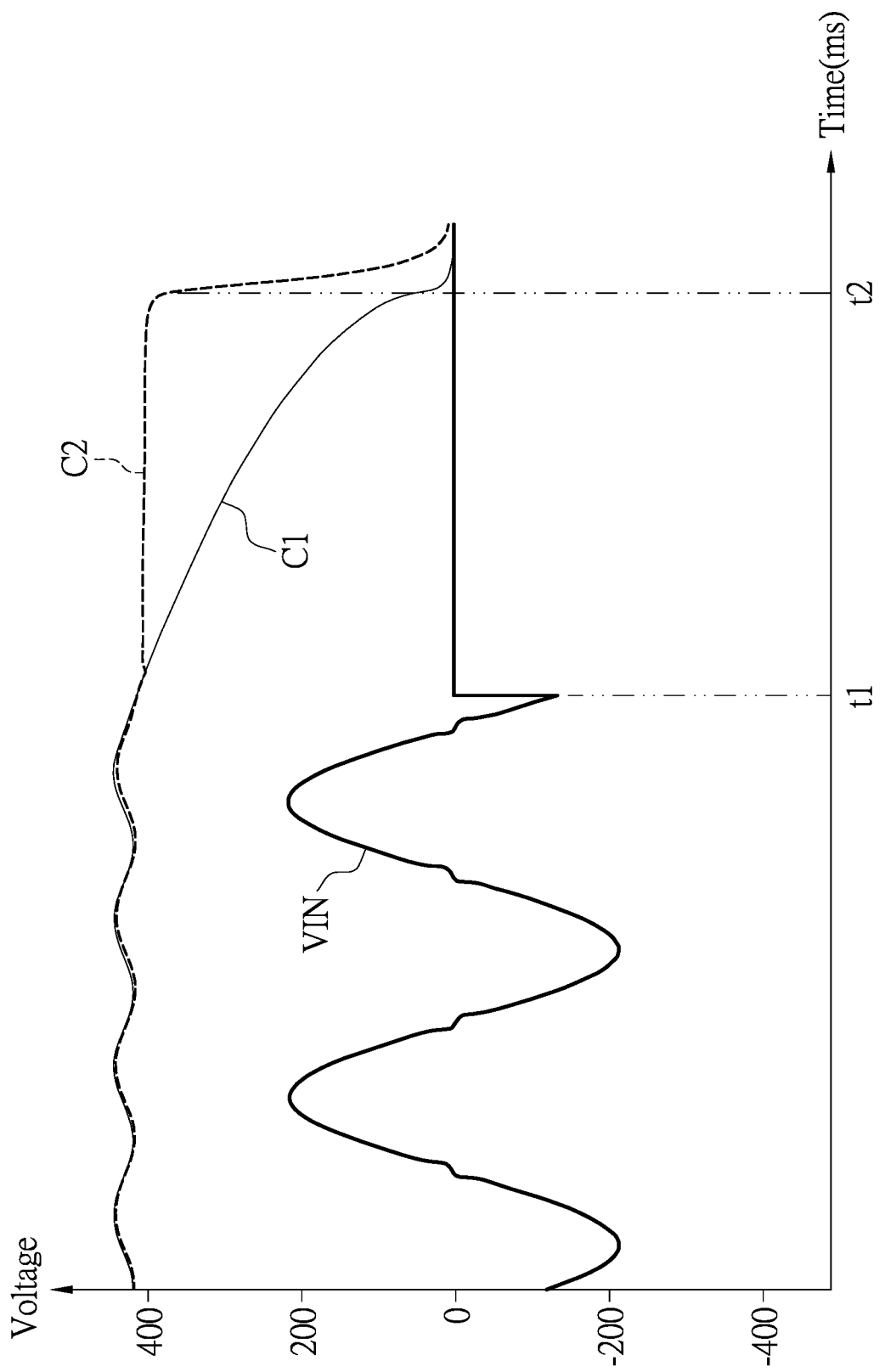
FIG. 8 is an exemplary timing diagram of voltages of an input power source, a first capacitor, and a second capacitor.

FIG. 8 is an exemplary timing diagram of voltages of an input power source, a first capacitor, and a second capacitor. Referring to FIG. 1, FIG. 3A, and FIG. 8, before a first time point t1, the input power source VIN is normal, the third switch S3 is in the off state, the fifth switch S5 is in the off state, and the fourth switch S4 is in the on state. From the first time point t1 onwards, the input power source VIN stops outputting an AC voltage signal, the controller 3 controls the third switch S3 and the fifth switch S5 to be switched from the off state to the on state, and the controller 3 controls the fourth switch S4 to be switched from the on state to the off state. When the third switch S3 and the fifth switch S5 are in the on state, and the input power source VIN stops outputting the AC voltage signal, the first capacitor C1 begins to discharge, and the electric charges discharged from the first capacitor C1 flow into the second capacitor C2 sequentially through the second inductance coil L2, the fifth switch S5, the third switch S3, and the first switch S1. Due to the discharge of the first capacitor C1, the voltage of the first capacitor C1 is decreased. The first switch S1, the third switch S3, the fifth switch S5, and the second inductance coil L2 can act as the boost converter to increase the voltage of the second capacitor C2. Therefore, even if the input power source VIN stops providing the power, the voltage of the second capacitor C2 is not immediately decreased but can be maintained until a second time point t2. A difference between the second time point t2 and the first time point t1 is the holdup time of the output voltage of the power factor correction circuit 1B of FIG. 3A.

In addition to the power factor correction circuit 1B of FIG. 3A, other embodiments of the power factor correction circuit (e.g. FIG. 1, FIG. 2A, FIG. 2B, FIG. 3B, FIG. 4A, FIG. 4B, FIG. 5, FIG. 6, and FIG. 7) can also increase the holdup time of the output voltage.

BENEFICIAL EFFECTS OF THE EMBODIMENTS

In conclusion, in the power factor correction circuit provided by the present disclosure, a holdup time of an output voltage of the power factor correction circuit is increased, and a volume of the first capacitor is reduced. Due to the reduced volume of the first capacitor, a power density of the power factor correction circuit is improved, and material costs for manufacturing of the power factor correction circuit are reduced. In addition, the power factor correction circuit can have more space available for adding new elements, so as to improve its efficiency.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power factor correction circuit, comprising:
   a first switch including a first terminal and a second terminal;
   a second switch including a third terminal and a fourth terminal, wherein the third terminal is connected to the second terminal;
   a third switch including a fifth terminal and a sixth terminal, wherein the fifth terminal is connected to the second terminal;
   a fourth switch including a seventh terminal and an eighth terminal, wherein the seventh terminal is connected to the first terminal;
   a fifth switch including a ninth terminal and a tenth terminal, wherein the ninth terminal is connected to the sixth terminal;
   a sixth switch including an eleventh terminal and a twelfth terminal, wherein the eleventh terminal is connected to the first terminal;
   a seventh switch including a thirteenth terminal and a fourteenth terminal, wherein the thirteenth terminal is connected to the twelfth terminal, and the fourteenth terminal is connected to the fourth terminal;
   a first inductance coil including a fifteenth terminal and a sixteenth terminal, wherein the sixteenth terminal is connected to the second terminal;
   a second inductance coil including a seventeenth terminal and an eighteenth terminal, wherein the seventeenth terminal is connected to the tenth terminal, and the eighteenth terminal is connected to the eighth terminal;
   a first capacitor including a nineteenth terminal and a twentieth terminal, wherein the nineteenth terminal is connected to the eighth terminal, and the twentieth terminal is connected to the fourth terminal; and
   a second capacitor including a twenty-first terminal and a twenty-second terminal, wherein the twenty-first terminal is connected to the first terminal, and the twenty-second terminal is connected to the fourth terminal.

2. The power factor correction circuit according to claim 1, wherein the first inductance coil is coupled to the second inductance coil.

3. The power factor correction circuit according to claim 1, wherein the third switch is a transistor.

4. The power factor correction circuit according to claim 3, wherein the fifth switch is a diode.

5. The power factor correction circuit according to claim 3, wherein the fifth switch is a transistor.

6. The power factor correction circuit according to claim 1, wherein the fourth switch is a transistor.

7. The power factor correction circuit according to claim 1, wherein the first switch is a transistor, and the second switch is a transistor.

8. The power factor correction circuit according to claim 1, wherein the sixth switch is a diode, and the seventh switch is a diode.

9. The power factor correction circuit according to claim 1, wherein the sixth switch is a transistor, and the seventh switch is a transistor.

10. The power factor correction circuit according to claim 1, further comprising a third inductance coil, wherein the third inductance coil includes a twenty-third terminal and a twenty-fourth terminal, and the twenty-fourth terminal is connected to the twelfth terminal.

11. The power factor correction circuit according to claim 10, wherein the third inductance coil is coupled to the first inductance coil.

12. The power factor correction circuit according to claim 11, wherein the third inductance coil is coupled to the second inductance coil.

13. The power factor correction circuit according to claim 10, wherein the third inductance coil is coupled to the second inductance coil.

14. The power factor correction circuit according to claim 1, further comprising a third inductance coil, an eighth switch, and a ninth switch, wherein the third inductance coil includes a twenty-third terminal and a twenty-fourth terminal, the eighth switch includes a twenty-fifth terminal and a twenty-sixth terminal, the ninth switch includes a twenty-seventh terminal and a twenty-eighth terminal, the twenty-third terminal is connected to the fifteenth terminal, the twenty-fifth terminal is connected to the first terminal, the twenty-sixth terminal is connected to the twenty-fourth terminal, the twenty-seventh terminal is connected to the twenty-fourth terminal, and the twenty-eighth terminal is connected to the fourth terminal.

15. The power factor correction circuit according to claim 14, wherein the third inductance coil is coupled to the first inductance coil.

16. The power factor correction circuit according to claim 15, wherein the third inductance coil is coupled to the second inductance coil.

17. The power factor correction circuit according to claim 14, wherein the third inductance coil is coupled to the second inductance coil.

18. The power factor correction circuit according to claim 14, further comprising a fourth inductance coil, a tenth switch, and an eleventh switch, wherein the fourth inductance coil includes a twenty-ninth terminal and a thirtieth terminal, the tenth switch includes a thirty-first terminal and a thirty-second terminal, the eleventh switch includes a thirty-third terminal and a thirty-fourth terminal, the twenty-ninth terminal is connected to the fifteenth terminal, the thirty-first terminal is connected to the first terminal, the thirty-second terminal is connected to the thirtieth terminal, the thirty-third terminal is connected to the thirtieth terminal, and the thirty-fourth terminal is connected to the fourth terminal.

19. The power factor correction circuit according to claim 18, wherein the first inductance coil is coupled to the third inductance coil, and the fourth inductance coil is coupled to the third inductance coil.

20. The power factor correction circuit according to claim 18, wherein the second inductance coil is coupled to the first inductance coil, the third inductance coil, and the fourth inductance coil.

* * * * *